(12) United States Patent
Huang et al.

(10) Patent No.: US 6,942,943 B2
(45) Date of Patent: Sep. 13, 2005

(54) CATALYST AND/OR ELECTROLYTE LOADED PLATE AND METHOD OF MAKING SAME

(75) Inventors: Chao M. Huang, Danbury, CT (US); Chao-Yi Yuh, New Milford, CT (US); Mohammad Farooque, Huntington, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 10/361,393

(22) Filed: Feb. 10, 2003

(65) Prior Publication Data

US 2004/0157104 A1 Aug. 12, 2004

(51) Int. Cl.[7] .......................... H01M 4/86; H01M 4/80; H01M 4/76; A21C 3/00
(52) U.S. Cl. ........................ 429/41; 429/237; 429/238; 425/375
(58) Field of Search .............................. 429/35, 36, 40, 429/41, 237, 238; 29/623.5; 425/375

(56) References Cited

U.S. PATENT DOCUMENTS

| | | | |
|---|---|---|---|
| 3,909,299 A | 9/1975 | Corrigan | 136/86 C |
| 4,035,551 A | 7/1977 | Grevstad | 429/44 |
| 4,038,463 A | 7/1977 | Lamarine et al. | 429/44 |
| 4,062,322 A | 12/1977 | Dormehl | 119/27 |
| 4,064,322 A | 12/1977 | Bushnell et al. | 429/41 |
| 4,182,795 A | 1/1980 | Baker et al. | 429/13 |
| 4,548,877 A | 10/1985 | Iacovangelo et al. | 429/41 |
| 4,596,751 A | 6/1986 | Kunz et al. | 429/41 |
| 4,788,110 A | 11/1988 | Bernard | 429/19 |
| 4,877,693 A | 10/1989 | Baker | 429/19 |
| 4,891,629 A * | 1/1990 | Gajjar et al. | 340/632 |
| 5,317,657 A * | 5/1994 | Gallo et al. | 385/14 |
| 5,468,573 A | 11/1995 | Bregoli et al. | 429/16 |
| 5,660,941 A | 8/1997 | Farooque et al. | 429/19 |
| 6,291,091 B1 * | 9/2001 | Preischl et al. | 429/30 |

* cited by examiner

Primary Examiner—Patrick Joseph Ryan
Assistant Examiner—Thomas H. Parsons
(74) Attorney, Agent, or Firm—Cowan, Liebowitz & Latman, P.C.

(57) ABSTRACT

A loaded plate for use with or as part of a fuel cell of a fuel cell stack in which the loading material of the plate is in cord form. The loading material can be either an electrolyte or a catalyst and the cord form is realized by extruding the loading material on the plate.

40 Claims, 10 Drawing Sheets

CATALYST AND/OR ELECTROLYTE LOADED PLATE AND METHOD OF MAKING SAME

FIELD OF THE INVENTION

This invention relates to fuel cell power plants and, in particular, to catalyst and/or electrolyte loaded plates for use in such power plants.

BACKGROUND OF THE INVENTION

Fuel cell power plants offer a highly efficient and environmentally clean system for power generation. In the operation of such power plants, hydrogen is used as a fuel and is usually derived from a hydrocarbon feedstock (e.g., natural gas or naphtha) by steam reforming in a separate unit external to the power plant. This is referred to as external reforming and is described in U.S. Pat. No. 3,909,299.

Another technique for generating hydrogen is to reform the hydrocarbon fuel directly within the fuel cell itself and, in particular, within the fuel cell anode compartment. This is referred to as internal reforming and is described in U.S. Pat. Nos. 4,182,795 and 4,877,693. Internal reforming has attracted considerable attention because it offers certain advantages in comparison with external reforming. These advantages include the following: (1) high overall efficiency of the fuel cell system due to on-site consumption of heat evolved in the cell reaction by the endothermic reforming reaction; (2) on-site supply of steam required for the steam-reforming reaction via the anode reaction product; (3) conversion approaching 100% by the consumption of hydrogen by the anode reaction; and (4) byproduct heat removal.

Figure 1:
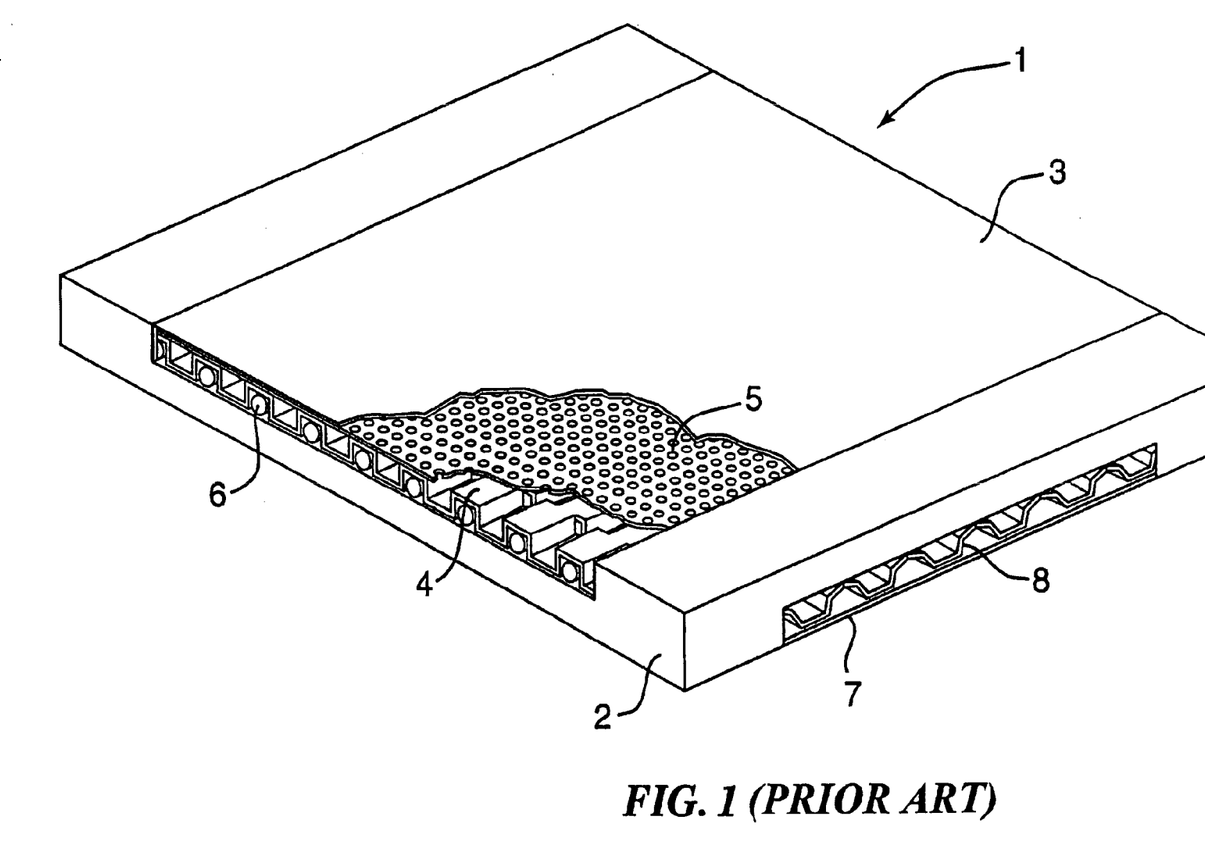
FIG. 1 shows the components of the anode compartment of a fuel cell used in a fuel cell stack.

Internal reforming, however, requires special adaptation of the fuel cell power plant to allow the appropriate catalyst to be incorporated inside the anode compartments of the fuel cells used in the fuel cell stack of the plant. FIG. 1 shows a typical fuel cell anode compartment 1 of such a fuel cell. As shown, the anode compartment comprises a separator plate 2 for isolating fuel from the oxidant stream of the neighboring fuel cell, an anode electrode 3 for providing electrochemical reaction sites, and an anode current collector 4, shown as a corrugated plate, for conducting electronic current from the anode electrode and providing a flow path for the gaseous fuel stream. The anode current collector 4 is separated from the anode electrode 3 by an electrolyte barrier 5 and is loaded with a reforming catalyst 6 for converting hydrocarbon feedstock to hydrogen. Also shown in FIG. 1, is the cathode electrode 7 and the cathode current collector 8 of the neighboring cell.

The reforming catalyst 6 is usually available in various compacted, solid shapes such as tablet, pellet, rod, ring or sphere form. Typical techniques for incorporating these types of catalysts in the corrugated space of the anode current collector are described in U.S. Pat. No. 4,788,110. However, there are certain disadvantages to these techniques. Due to the small size of the catalyst particles, handling the particles during assembly is cumbersome and difficult to automate and, therefore, not cost effective. Also, loading uniformity from the fuel cell power plant to fuel cell power plant is hard to achieve. Another difficulty is catalyst shifting and spilling during assembly, handling, transportation and operation.

U.S. Pat. No. 5,660,941, assigned to the same assignee hereof discloses a type of catalyst which avoids some of these difficulties. The catalyst described in this application is in the form of a thin sheet of catalyst material having openings throughout its surface. In particular, the catalyst openings and the pitch of the openings are designed to match the anode current collector corrugations or "legs."

The catalyst sheet can thus be placed on the current collector, and the sheet held in position by the legs sticking out through the matched openings. As can be appreciated, use of the catalyst sheet avoids catalyst handling problems attendant the use of catalyst particles. However, fabricating a catalyst sheet with the required openings is difficult and may not be as cost effective as is desired.

Another concern facing internal reforming fuel cell power plants, particularly carbonate fuel power plants, is how and where to store sufficient electrolyte to maintain adequate inventory over the desired life of the plant. This may extend to 40,000 to 50,000 hours of use. In fuel cell stacks utilizing carbonate fuel cell power plants, a melted carbonate is used as the electrolyte and is stored in an inert porous matrix plate.

Besides its electrochemical functions, the melted carbonate electrolyte acts to seal and separate reactants through its liquid capillary forces. Thus, it is essential that the pore volume of the matrix be completely filled with the electrolyte during the fuel cell power plant operation. However, during such operation, the electrolyte is gradually lost through evaporation, creepage and corrosion. Thus, to maintain the sealing function and ionic continuity within the fuel cell power plant, sufficient electrolyte needs to be stored in excess of the minimum needed for initial operation.

Arrangements for ensuring sufficient storage of carbonate electrolyte in fuel cell power plants have been disclosed is several U.S. patents (e.g., U.S. Pat. Nos. 4,035,551, 4,064,322, 4,038,463, 4,548,877, 4,596,751 and 5,468,573). One arrangement employs a thick matrix tile between the anode and the cathode electrodes to store the electrolyte. However, such a thick matrix causes high IR losses.

Another disclosed arrangement uses a thin green tape of carbonate electrolyte particles which are held together by a binder. This electrolyte tape is placed between the electrodes and the electrolyte matrix during the stacking of the fuel cell components. The binder is removed during heat-up of the resultant fuel cell stack, followed by the melting of the carbonate particles in situ so that the carbonate flows into the matrix. However, this arrangement causes the fuel cell stack to be dimensionally unstable during the electrolyte melting which is not desirable for stack mechanical stability.

Another arrangement being considered uses the electrodes of the fuel cell power plant as the electrolyte reservoir. In this case, the storage of the electrolyte is achieved by seeping melted electrolyte directly into the porous electrodes of each of the fuel cells prior to the assembly of the cells into a stack. This appears desirable for a stack whose fuel cells have sufficiently thick electrodes so as to accommodate a large enough amount of electrolyte to ensure that after the electrolyte filling of the matrix of each cell, a sufficient amount of the melted electrolyte will remain in the electrodes to sustain prolonged life. To realize this condition, relatively thick electrodes must be used, increasing stack height as well as cost.

A different technique for solving the electrolyte storage problem is disclosed in U.S. Pat. No. 5,468,573, assigned to the U.S. Government. In this technique, an electrolyte paste is placed in the corrugated space of the cathode current collector of each fuel cell prior to the assembly of the cells into a stack. The electrolyte paste contains electrolyte powder mixed with a removable binder such as petroleum jelly, bees wax or glycerin. This technique is capable of providing sufficient amount of electrolyte in the fuel cell. However, the '573 patent fails to describe any methods for packing the electrolyte inside the corrugated current collector.

Methods which may be feasible for accomplishing this are manual or automatic pressing. However, in using a pressing procedure, the amount and the uniformity of the electrolyte are difficult to control. Additionally, it is extremely difficult to pack the electrolyte paste into the corrugated space without overflowing onto undesired contact surfaces.

It is, therefore, an object of the present invention to provide a catalyst or an electrolyte loaded plate which does not suffer from the above-described disadvantages.

It is a further object of the present invention to provide a catalyst or an electrolyte loaded plate formed to permit ease and efficiency of manufacture.

It is a further object of the invention to provide an apparatus and method for forming a catalyst or electrolyte loaded plate.

SUMMARY OF THE INVENTION

In accordance with the principles of the present invention, the above and other objects are realized in a plate loaded with either a catalyst or electrolyte loading material by forming the loading material as a cord. Preferably, the cord form of the material is realized by extruding the loading material onto the plate, preferably into channels of the plate. The plate is also preferably used as a current collector plate of a fuel cell used in a fuel cell stack.

In a further aspect of the invention, an apparatus and method are disclosed for fabricating the loaded plate in which the plate is supported on a table and an extruder is situated above the plate. A control mechanism controls the plate and extruder so that the extruder extrudes a cord of material along a first channel of the plate The plate and extruder are then repositioned or indexed relative to each other so that the extruder extrudes a cord of material in a second channel of the plate. This process is repeated until the desired channels are loaded with cords of loading material.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

Figure 2:
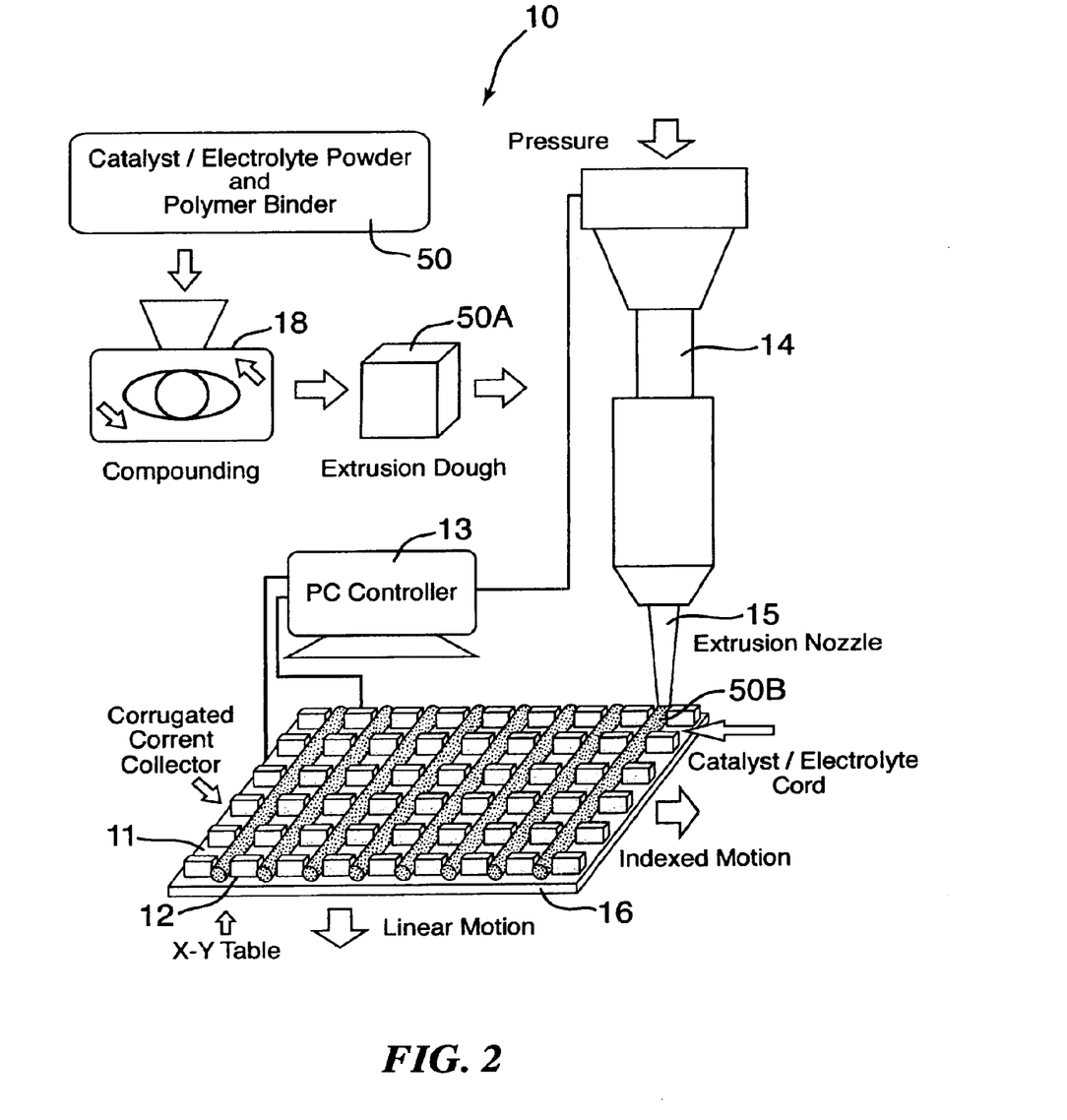
FIG. 2 illustrates schematically a system for loading catalyst or electrolyte loading material onto a plate in accordance with the principles of the present invention.

FIG. 2 shows a system 10 for loading a catalyst or electrolyte material 50, i.e., a loading material, in the form of cords 50B onto a plate 11, in accordance with the principles of the present invention. In the case shown, the plate 11 is a current collector plate of a fuel cell to be used in a fuel cell stack. As illustrated, the plate 11 is corrugated to define channels 12 into which cords of the loading material in any desired shape can be fitted. Preferably, continuous cords 50B of the loading material with the desired shape are made by extrusion. The loading of these cords into the channels 12 of the current collector plate 11 is automatically carried out in-situ via a PC controller 13, an extruder 14 with a nozzle or head 15 and an X-Y position table 16.

More particularly, the current collector plate 11 is first placed on the X-Y table with its corrugations or legs defining the channels facing toward the extruder nozzle 15. A PC controller 13 then coordinates operation of the extruder 14 containing the loading material in dough form 50A and the X-Y table 16. Specifically, the extruder 14 is caused to extrude cords 50B of the loading material through the nozzle 15, as the X-Y table 16 moves at a given speed and pattern to guide the extruded cords 50B into the desired channels 12 of the plate 11. The cords are preferably of a length $\geq 0.5''$.

The moving speed of the X-Y table 16 is determined according to the extrusion speed and required cord diameter. The moving pattern of the X-Y table 16 is, in turn, designed according to the desired loading pattern. As can be appreciated, various loading patterns can be generated via computer software for optimization of the reforming efficiency and the uniformity of the loading material distribution on the plate.

The loading material dough 50A is formed from the loading material 50 comprised of a loading material powder and a polymer binder. These materials are compounded or mixed in a mixer 18 to form a uniform extrudable mixture as the loading material dough 50A. The mixer 18 can be a high shear blade-mixer. The extrudable mixture typically contains about 5 to 15 wt.-% polymer binder. Either a solvent-based or water-based binder system can be used.

After the loading material dough 50A is formed by the mixing procedure, the dough is transferred into the extruder 14 for cord extrusion. As above-described, the loading material cords are formed as the dough is extruded through the extruder nozzle 15 through the action of the extruder 14, which can be either a piston type or screw type extruder. As also above-described, the cords are guided into the channels of the current collector plate 11 through the movement of the X-Y table 16.

The diameter of the extruded cords depends on the current collector geometry and can be controlled through the nozzle size, extrusion speed and dough viscosity. Preferably, the cord diameter is selected such that the cord can be caught in between the adjacent legs or corrugations forming the channels 12 of the current collector plate 11.

Figure 10:
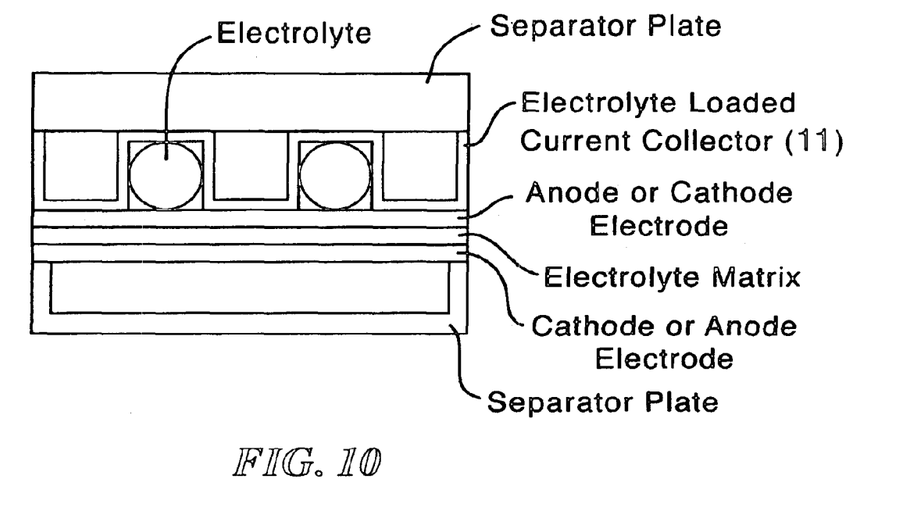
FIGS. 10 and 11 illustrate schematically fuel cells incorporating electrolyte and catalyst loaded current collector plates in accordance with the principles of the present invention.
Figure 11:
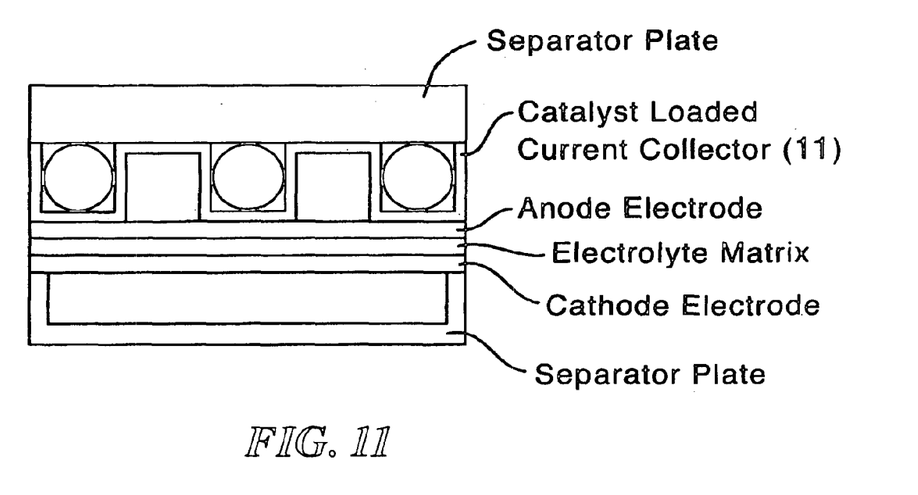

Once the loading material/current collector assembly is complete, the assembly can be placed together with a separator plate and cathode and/or anode assemblies to form a fuel cell of a fuel cell stack. This is shown in FIGS. 10 and 11. FIG. 10 shows the current collector 11 being used as an anode current collector of a fuel cell, while FIG. 11 shows the current collector 11 being used as a cathode current collector of a fuel cell.

The loading material cords can be processed in situ during the preconditioning step of the fuel cell power plant at the time of start-up, where the polymer binder contained in the loading material cord is removed. Alternatively, a separate processing step, either on the loaded plate itself or when incorporated into the fuel cell power plant, can be used for binder removal and/or preconditioning of the loading material.

EXAMPLE OF CATALYST LOADING MATERIAL LOADING ANODE CURRENT COLLECTOR PLATE

An example of a powder/binder 50 mixture for a catalyst loading material is given in Table 1 below.

TABLE 1

Formulation for the Catalyst Extrusion

|  | Weight (g) | Density (g/cc) | Volume | Dry Wt % | Dry Vol. % |
|---|---|---|---|---|---|
| Catalyst Powder | 300 | 4.11 | 73 | 88.2 | 69.9 |
| polyvinyl Alcohol (PVA) | 20 | 1.29 | 15.5 | 5.9 | 14.9 |
| Glycerol | 20 | 1.26 | 15.9 | 5.9 | 15.2 |
| DI Water | 80 | 1 | 80 | | |

Figure 3:
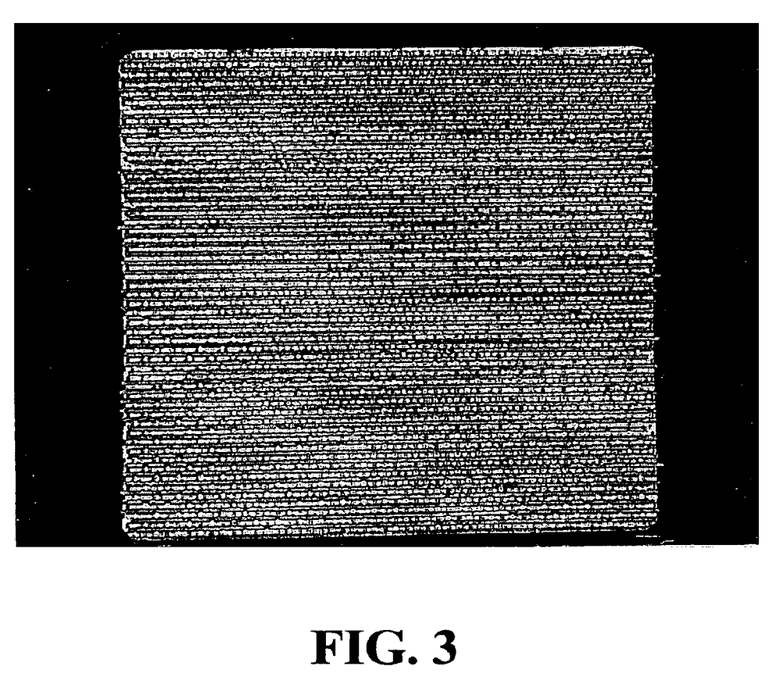
FIG. 3 illustrates a corrugated current collector plate loaded with catalyst cords in accordance with the principles of the present invention.

Sulfur is undesired for the catalyst, therefore, a sulfur-free binder is used. A commercial grade reforming catalyst powder with particle size between 1 to 100 $\mu$m and the binder were mixed at room temperature in a blade-mixer for 15 minutes to form an extrudable dough. The dough was placed in a piston extruder with a piston of 1.5" diameter and a nozzle of 0.05" diameter under a constant pressure of about 10,000 psi. The extruded cords were fed into a 250 cm$^2$ anode corrugated current collector in the manner as described above. The resultant loaded anode current collector (250 cm$^2$) with the extruded catalyst cord is shown in FIG. 3, in which about 50 mg/cm$^2$ catalyst was loaded.

Figure 4A:
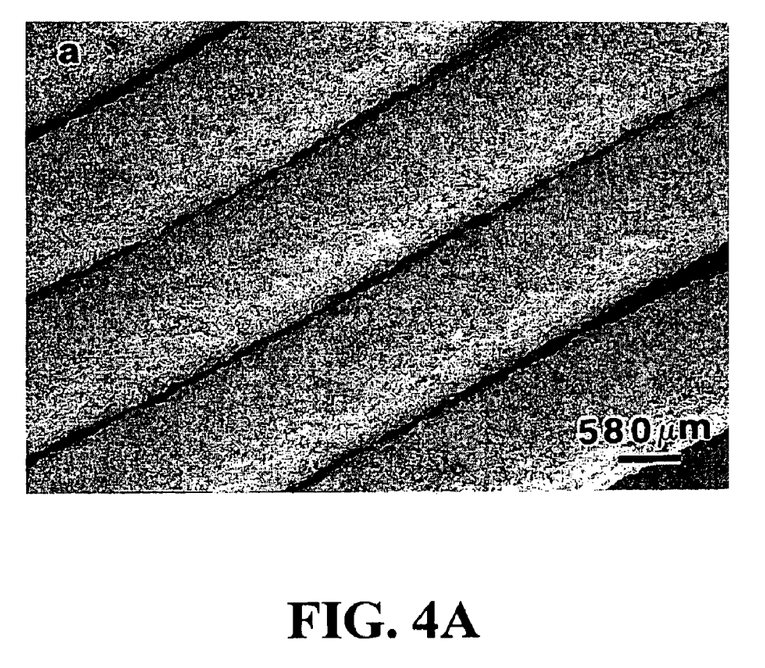
FIG. 4A shows a micrograph of catalyst cords in accordance with the principles of the present invention.
Figure 4B:
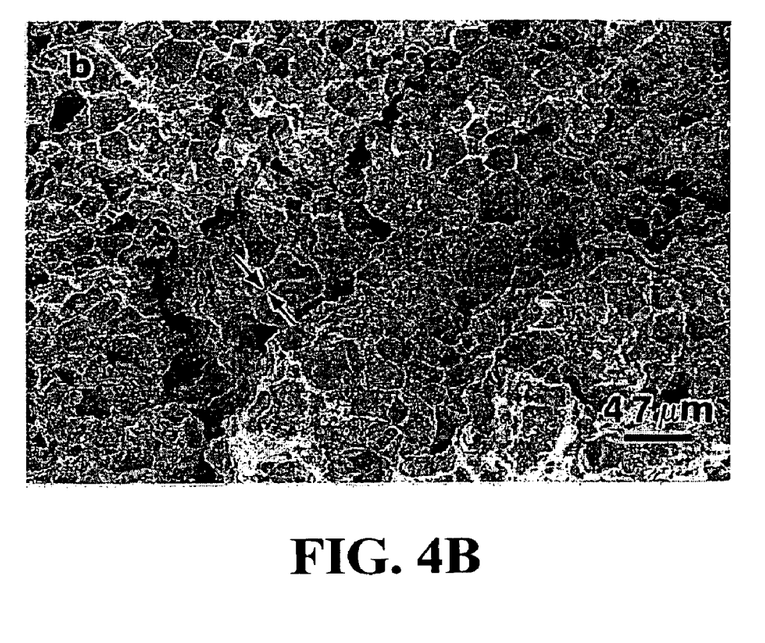
FIG. 4B illustrates a micrograph of a cross-section of a catalyst cord shown in FIG. 4A.
Figure 5A:
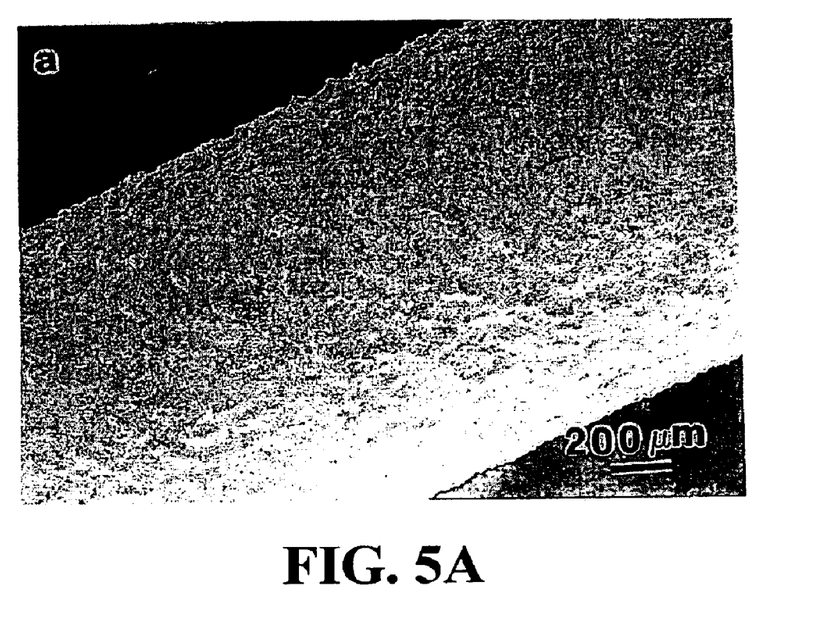
FIG. 5A shows a micrograph of a catalyst cord with binder removal in accordance with the principles of the present invention.
Figure 5B:
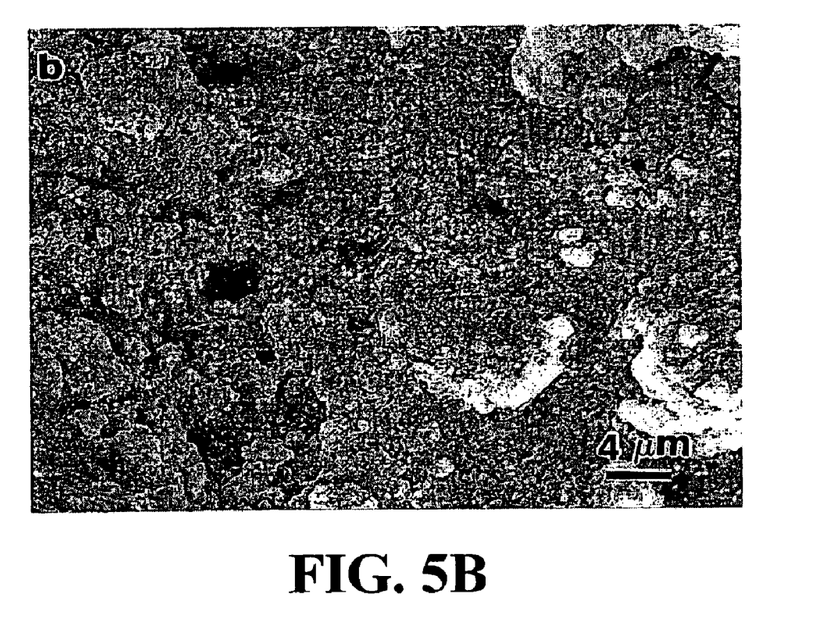
FIG. 5B shows a micrograph of the microstructure of the catalyst cord of FIG. 5A.

The microstructure and pore size distribution of the catalyst cord were characterized by a scanning electron microscope (SEM) and mercury porosimetry. The SEM micrographs (FIGS. 4(A) and 4(B)) show the morphology of the as-extruded catalyst cord. The quality of the extrusion is evidenced by the uniform surface morphology (FIG. 4(A)) of the cord. The morphology of the fractured cross-section (FIG. 4(B)) shows that the binder is homogeneously distributed and surrounds each catalyst particle (arrowed). Polymer removal from the catalyst cord was conducted at 410° C. in an oxidizing environment. The temperature was slowly (2° C./min) raised to 410° C. and held for 2 hours for complete polymer removal. The burn-out catalyst cord shows structural integrity (FIG. 5(A)) despite the porous microstructure (FIG. 5(B)).

Figure 6:
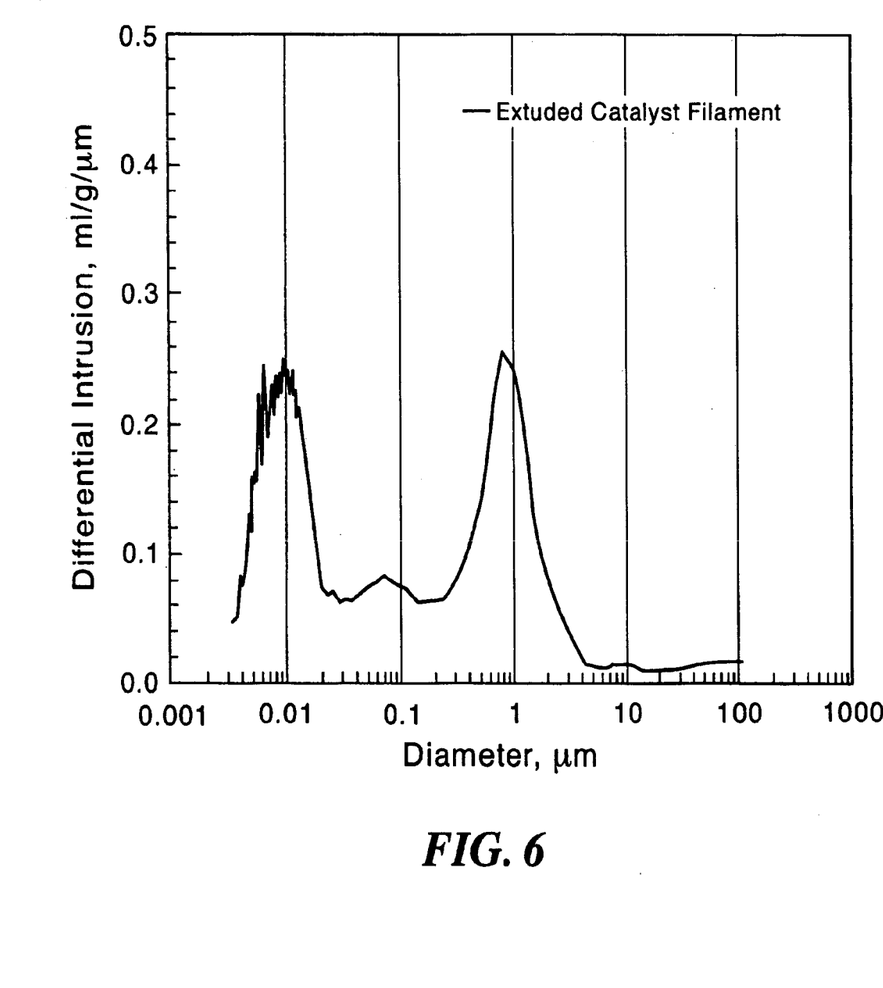
FIG. 6 is a graph of mercury porosimetry analysis of a catalyst cord of the type shown in FIGS. 5A and 5B.

The porosimetry analysis revealed that the burn-out catalyst cord contains ~45 to 60 vol.-% porosity. There are two different pore-size distributions inside the burn-out catalyst cord (FIG. 6): the pore-size at $\leq 0.01$ $\mu$m range and at $\geq 5$ $\mu$m range. The larger pores, which are generated by the polymer and the extrusion process, are useful for reducing the diffusion resistance of the reactants to the catalyst active sites. The small pores, which are contained inside the catalyst particles, contain the majority of the surface area for the reaction. The volume ratio of the large pores to small pores is carefully controlled for providing ease of reactant access to the catalyst active sites and the removal of products without losing catalyst activity. Usually, the large pores of 30 to 35 vol.-% of the total porosity is believed to be optimal.

Figure 7:
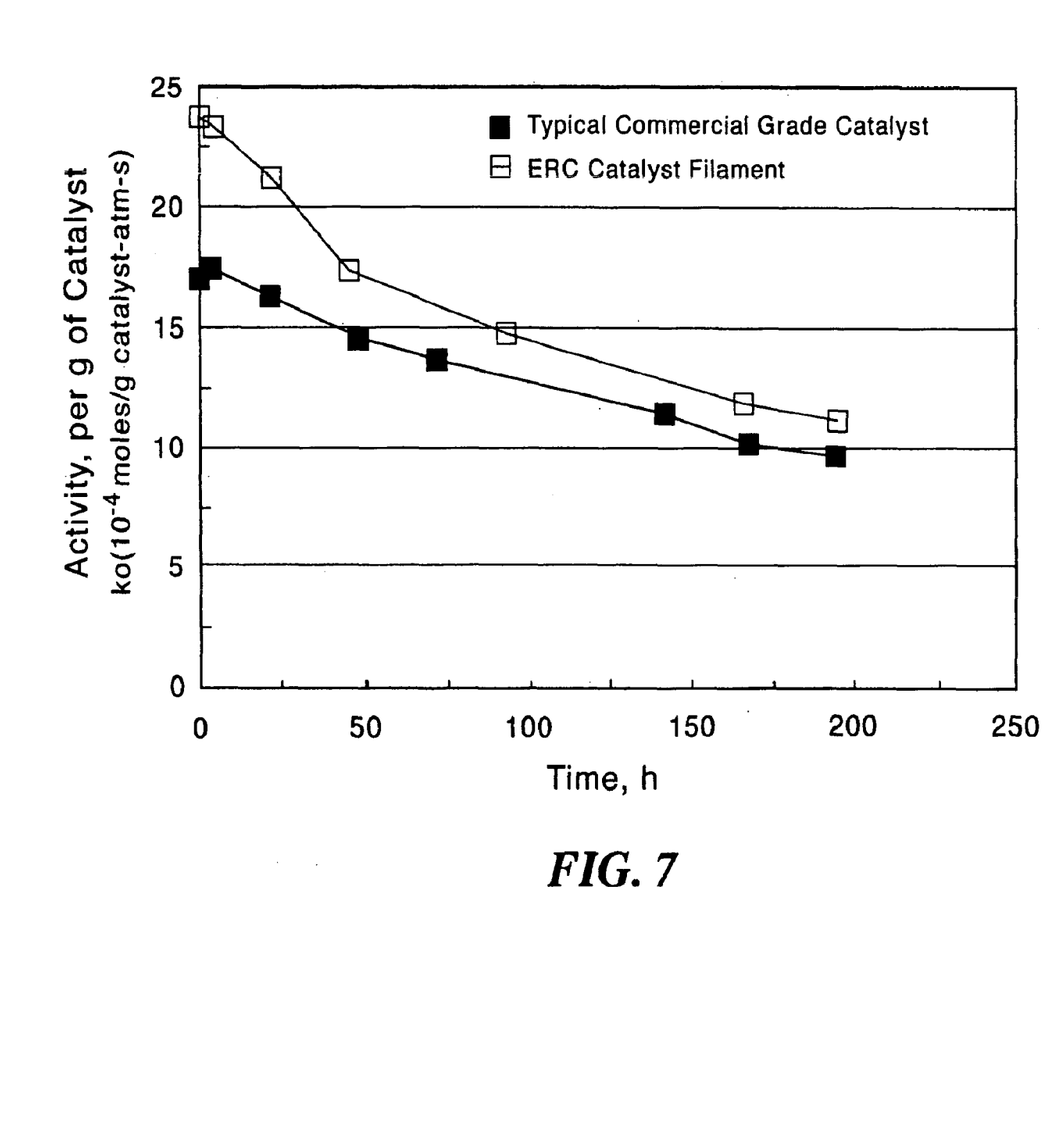
FIG. 7 is a graph of accelerated activity of catalyst cords as compared to the activity of a typical commercial grade catalyst.

Accelerated activity tests of the extruded catalyst cord were conducted in a high-temperature reactor. All activity tests were carried out under an absolute pressure of ca. 740 Torr, with a feed composition of $CO_2/CH_4=1/11.8$ and a total feed flow rate of 20 sccm (space velocity ca. 10000–20000 h$^{-1}$) at 700° C. The accelerated activity tests indicated that the extruded catalyst cord performance was similar to or better than that of typical commercial grade catalyst pellets (FIG. 7).

Figure 8:
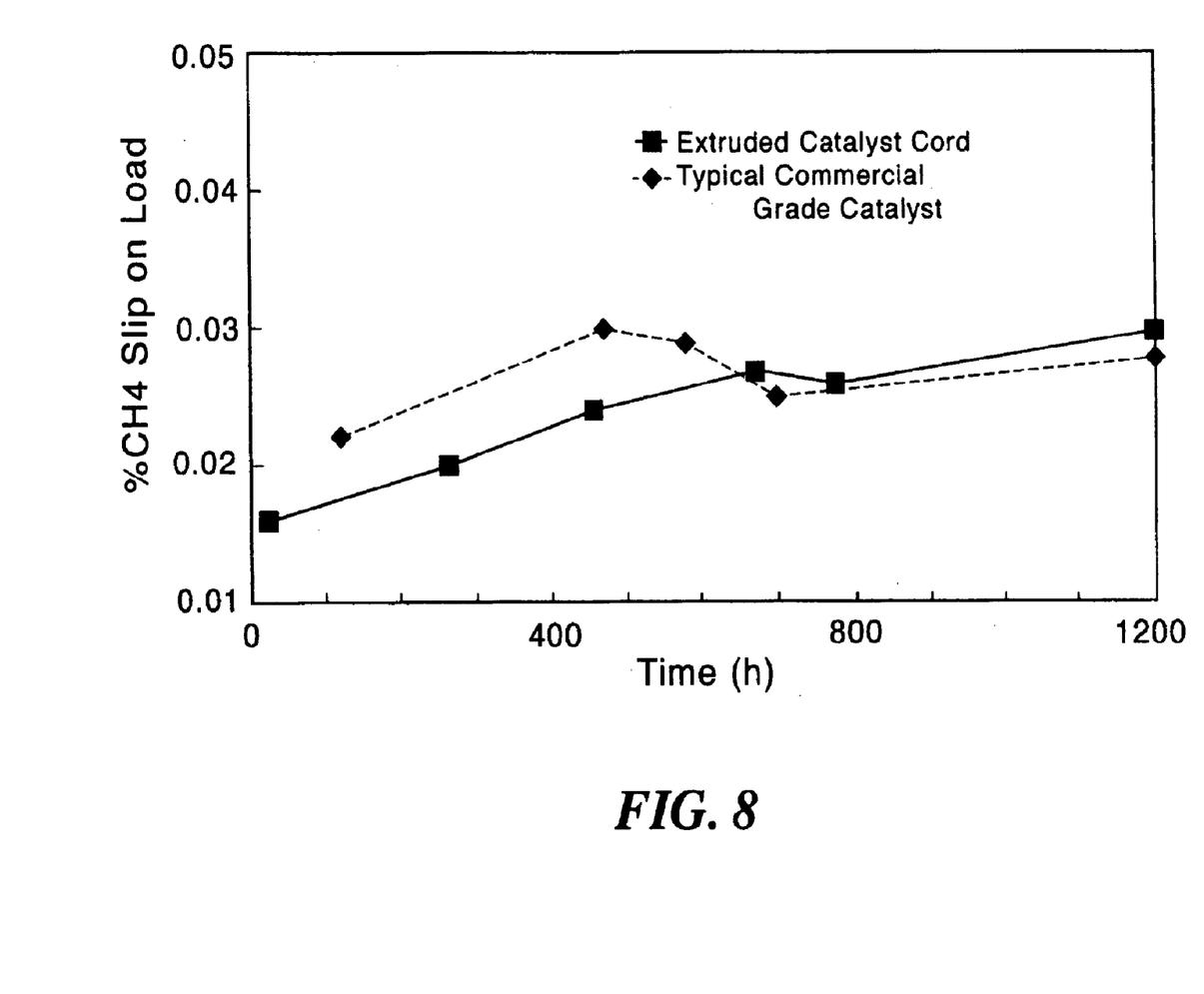
FIG. 8 illustrates an accelerated stability test of a single cell carbonate fuel cell power plant using catalyst cords in accordance with the invention compared with a cell using a typical commercial grade catalyst.

The performance of the catalyst cord was also evaluated in a bench-scale carbonate fuel cell power plant (250 cm$^2$). A comparison of the $CH_4$ conversion in the single cell power plant accelerated decay mode with a typical commercial catalyst is given in FIG. 8, indicating that the extruded catalyst cord has similar performance as the commercial ones.

EXAMPLE OF ELECTROLYTE LOADING MATERIAL LOADING A CURRENT COLLECTOR PLATE

Figure 9:
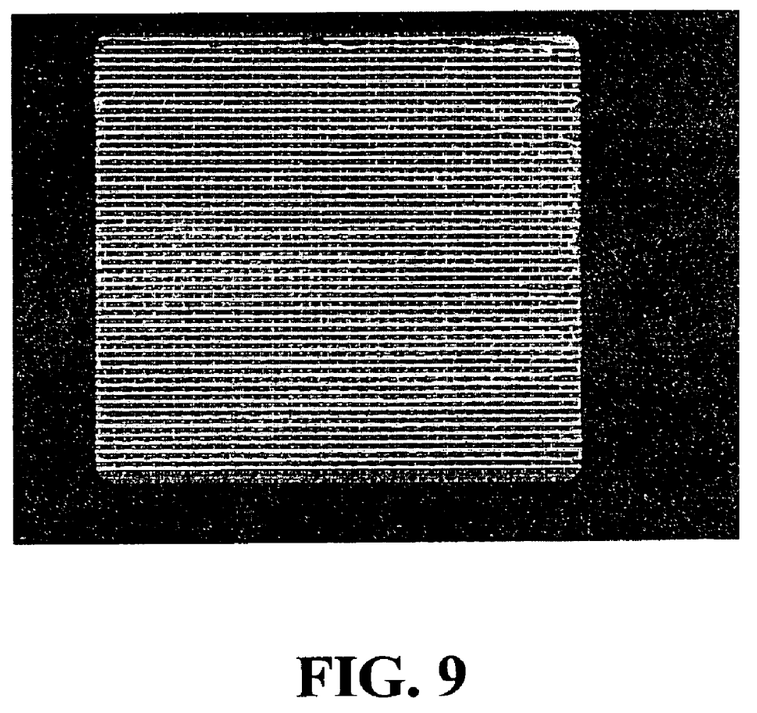
FIG. 9 is an optical micrograph of a corrugated current collector plate loaded with electrolyte cords in accordance with the principles of the present invention.

An example of the in-situ extrusion and loading of a corrugated current collector plant with an electrolyte loading material in cord form is shown in FIG. 9. Using the above-described procedure and assembly, 15 grams of electrolyte cords were loaded automatically in the channels (250 cm$^2$) of a current collector plate without contaminating the current collector surface. The dough used for the electrolyte extrusion was prepared from an electrolyte powder (such as 62 mole percent Li/38 mole percent K carbonate) and glycerol or low molecular weight (200 to 400) polyethylene glycol at a volume ratio of 85/15.

The glycerol/polyethylene glycol is a relatively nontoxic and nonflammable material, and can evaporate or chemically decompose without leaving any undesirable residue when the loaded plate is heated. This can occur in-situ when the current collector plate is used for the anode or cathode current collector of a fuel cell power plant as the plant is heated to its operating temperature to melt the electrolyte.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, the cords 50B of loading material can be continuous or discontinuous and flexible or rigid. Additionally, the catalyst powder used to form the catalyst loading material dough 50A can be a calcinated or non-calcinated type.

What is claimed is:

1. An assembly for use with or as part of a fuel cell used in a fuel cell stack, comprising:

a plate; and a loading material in cord form disposed on said plate, said loading material comprising one or more of an electrolyte and a catalyst.

2. An assembly in accordance with claim 1 wherein:

said loading material is extruded to obtain said cord form.

3. An assembly in accordance with claim 2 wherein:

said plate includes channels and said loading material is situated in said channels.

4. An assembly in accordance with claim 3 wherein:

said plate is one of an anode and cathode current collector plate.

5. An assembly in accordance with claim 4 wherein:

said plate is corrugated to define said channels.

6. An assembly in accordance with claim 4 wherein:

said electrolyte is a carbonate.

7. An assembly in accordance with claim 1 wherein:

said electrolyte is a carbonate.

8. An assembly in accordance with claim 1 wherein:

said assembly is one of an anode and cathode assembly and said plate is a current collector of said assembly.

9. An assembly in accordance with claim 1 wherein:

said assembly is a fuel cell and said plate is a part of said fuel cell.

10. An assembly in accordance with claim 9 wherein:

said fuel cell includes an anode assembly and a cathode assembly and said plate is a current collector of one of said anode assembly and cathode assembly.

11. An assembly in accordance with claim 1 wherein:

each cord of loading material is of a length $\geq$ about 0.5".

12. An assembly in accordance with claim 11 wherein:

each cord of catalyst loading material has a 45 to 60 percent volume porosity.

13. An assembly in accordance with claim 1 wherein:

said loading material is a catalyst loading material; and each cord of catalyst loading material has small pores of a size in the hundredths of a micrometer range and large pores of a size in the ones of micrometer range.

14. An assembly in accordance with claim 13 wherein:

said large pores account for 30 to 35 volume percent of the total porosity of each cord of loading material.

15. An assembly in accordance with claim 13 wherein:

the size of said small pores is in a range $\leq 0.01$ $\mu$m; and the size of said large pores is in a range $\geq 5$ $\mu$m.

16. A method of fabricating a plate for use with or as part of a fuel cell used in a fuel cell stack comprising:

positioning said plate to receive a loading material; and depositing said loading material in cord form on said plate, said loading material comprising one or more of an electrolyte and a catalyst.

17. A method in accordance with claim 16 wherein:

said depositing step includes extruding said loading material onto said plate with an extruder.

18. A method in accordance with claim 17 wherein:

said positioning includes situating said plate on a table; and said method further includes causing relative movement between said plate and said extruder.

19. A method in accordance with claim 18 wherein:

said plate has channels;

said plate is situated on said table with said channels facing said extruder; and said relative movement between said table and said extruder causes said loading material in cord form to be deposited in said channels.

20. A method in accordance with claim 19 wherein:

said depositing step further includes: forming said loading material including mixing loading material particles with a binder to form a dough.

21. A method in accordance with claim 20 further comprising:

heating said loaded plate to remove said binder.

22. A method in accordance with claim 21 wherein:

said heating is conducted when said loaded plate is incorporated into the fuel cell of the fuel cell stack.

23. A method in accordance with claim 16 further comprising:

incorporating said loaded plate into one of an anode assembly and cathode assembly as a current collector.

24. A method in accordance with claim 23 further comprising:

incorporating said one of said anode assembly and said cathode assembly into the fuel cell of the fuel cell stack.

25. A method in accordance with claim 16 wherein:

said electrolyte material is a carbonate.

26. A method in accordance with claim 16 wherein:

said depositing step further includes: forming said loading material including mixing loading material particles with a binder to form a dough.

27. A method in accordance with claim 26 further comprising:

removing said binder material from each said cord of loading material.

28. A method in accordance with claim 27 wherein:

said removing is carried out by heating.

29. A method in accordance with claim 27 wherein:

said loading material is an electrolyte loading material; and said binder is one of glycerol and low molecular weight polyethylene glycol.

30. A method in accordance with claim 29 wherein:

said electrolyte material is a carbonate.

31. A method in accordance with claim 27 wherein:

said loading material is a catalyst material.

32. A method in accordance with claim 31 wherein:

said particles of loading material have a size in the range of 1 to 100 $\mu$m.

33. A method in accordance with claim 31 wherein:

said removing step results in each cord of catalyst material having small pores of a size in the hundredths of a micrometer range and large pores of a size in the ones of micrometer range.

34. A method in accordance with claim 33 wherein:

the size of said small pores is in a range of $\leq 0.01$ $\mu$m; and the size of said large pores is in a range of $\geq 5$ $\mu$m.

35. A method in accordance with claim 33 wherein:

said large pores account for 30 to 50 percent of the total porosity of each cord of loading material.

36. Apparatus for fabricating a plate for use with or as part of a fuel cell used in a fuel cell stack comprising:

means for positioning said plate to receive a loading material; and means for depositing said loading material in cord form on said plate, said loading material comprising one or more of a catalyst material and an electrolyte material.

37. An apparatus in accordance with claim 36 wherein:

said means for depositing includes an extruder for extruding said loading material onto said plate.

38. An apparatus in accordance with claim 37 wherein:

said means for positioning includes: a table supporting said plate; and means for causing relative movement between said table and said extruder.

39. An apparatus in accordance with claim 38 wherein:

said plate has channels;

said plate is situated on said table with said channels facing said extruder;

and said relative movement between said table and said extruder causes said loading material in cord form to be deposited in said channels.

40. An apparatus in accordance with claim 39 wherein:

said means for depositing further includes: means for forming said loading material including a mixer for mixing loading material particles with a binder to form a dough.

* * * * *

UNITED STATES PATENT AND TRADEMARK OFFICE
CERTIFICATE OF CORRECTION

PATENT NO. : 6,942,943 B2
DATED : September 13, 2005
INVENTOR(S) : Chao M. Huang et al.

It is certified that error appears in the above-identified patent and that said Letters Patent is hereby corrected as shown below:

Column 1,
Line 4, insert the following:
 -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Eleventh Day of April, 2006

JON W. DUDAS
*Director of the United States Patent and Trademark Office*